(12) United States Patent
Yoo et al.

(10) Patent No.: US 12,148,083 B2
(45) Date of Patent: Nov. 19, 2024

(54) METHOD AND SYSTEM FOR CREATING AVATAR CONTENT

(71) Applicant: LINE Plus Corporation, Seongnam-si (KR)

(72) Inventors: Jinhee Yoo, Seongnam-si (KR); Soo Jin An, Seongnam-si (KR)

(73) Assignee: LINE Plus Corporation, Seongnam-Si (KR)

( * ) Notice: Subject to any disclaimer, the term of this patent is extended or adjusted under 35 U.S.C. 154(b) by 107 days.

(21) Appl. No.: 17/964,414

(22) Filed: Oct. 12, 2022

(65) Prior Publication Data

US 2023/0115818 A1 Apr. 13, 2023

(30) Foreign Application Priority Data

Oct. 13, 2021 (KR) .................. 10-2021-0135551

(51) Int. Cl.
| | | |
|---|---|---|
| G06T 13/40 | (2011.01) | |
| G06F 3/04842 | (2022.01) | |
| G06F 3/16 | (2006.01) | |
| G06Q 50/10 | (2012.01) | |
| G06T 19/00 | (2011.01) | |
| G06T 19/20 | (2011.01) | |

(52) U.S. Cl.
CPC ............. *G06T 13/40* (2013.01); *G06F 3/16* (2013.01); *G06T 19/20* (2013.01); *G06F 3/04842* (2013.01); *G06Q 50/10* (2013.01); *G06T 19/003* (2013.01); *G06T 2200/24* (2013.01); *G06T 2219/2024* (2013.01)

(58) Field of Classification Search
CPC ..... G06T 13/40; G06T 19/20; G06T 2200/24; G06T 2219/2024; G06T 19/003; G06F 3/16; G06F 3/04842; G06Q 50/10
See application file for complete search history.

(56) References Cited

U.S. PATENT DOCUMENTS

| | | | |
|---|---|---|---|
| 2005/0137015 A1* | 6/2005 | Rogers ............... | A63F 13/12 463/42 |
| 2007/0066403 A1* | 3/2007 | Conkwright ........ | A63F 13/803 463/43 |
| 2011/0296324 A1* | 12/2011 | Goossens ............ | G06Q 50/01 715/763 |
| 2012/0158531 A1* | 6/2012 | Dion .................. | G06Q 50/01 705/26.1 |
| 2013/0132837 A1* | 5/2013 | Mead .................. | G06Q 10/10 715/716 |
| 2014/0337324 A1* | 11/2014 | Chao .................. | G06F 7/08 707/722 |

(Continued)

*Primary Examiner* — YuJang Tswei
(74) *Attorney, Agent, or Firm* — Sughrue Mion, PLLC

(57) ABSTRACT

A method for creating avatar content includes receiving, from a user, a first user input selecting a first content including time-series actions of a first avatar and a second avatar, displaying a first user interface for selecting one of the first avatar and the second avatar in the first content, receiving, from the user through the first user interface, a second user input selecting the first avatar, and in response to the receiving the second user input, generating a user-customized content by adding, to the first content, a third avatar associated with the user that performs a same action as the selected first avatar.

17 Claims, 11 Drawing Sheets

(56) References Cited

U.S. PATENT DOCUMENTS

| | | | | |
|---|---|---|---|---|
| 2016/0127796 A1* | 5/2016 | Wuchter | ............ | H04N 21/4882 |
| | | | | 725/34 |
| 2017/0312574 A1* | 11/2017 | Matsuzawa | ............ | G16H 20/30 |
| 2018/0091732 A1* | 3/2018 | Wilson | ................ | H04N 23/631 |
| 2018/0239144 A1* | 8/2018 | Woods | ................ | A63F 13/213 |
| 2019/0295056 A1* | 9/2019 | Wright | .............. | G06Q 30/0641 |
| 2019/0339847 A1* | 11/2019 | Scapel | ................... | G06T 13/80 |
| 2019/0370492 A1* | 12/2019 | Falchuk | ................ | G06T 19/00 |

* cited by examiner

METHOD AND SYSTEM FOR CREATING AVATAR CONTENT

CROSS-REFERENCE TO RELATED APPLICATION

This application is based on and claims priority to Korean Patent Application No. 10-2021-0135551, filed on Oct. 13, 2021, in the Korean Intellectual Property Office, the disclosure of which is incorporated herein by reference in its entirety.

BACKGROUND

1. Field

The present disclosure relates generally to a method and a system for creating an avatar content, and in particular, to a method and a system for creating a user-customized content by adding, to a content including time-series actions of one or more avatars, an avatar associated with a user who performs the same action as at least one avatar in the content.

2. Description of Related Art

There is a widespread distribution of camera-attached terminals, such as smartphones, tablet personal computers (PCs), laptop computers, desktop computers, and the like. In this environment, growing numbers of users utilize cameras attached to terminals. As a representative example, services are provided, which use the camera attached to the terminal to use an avatar that is a representation of a user's character in a virtual space.

As the avatar services are provided, there is a need for the creation of various contents (e.g., avatar videos, and the like) using avatars. However, for the task of creating or editing the avatar content, such as adding various actions of avatars to the content or editing the actions of avatars, advanced skills are generally required, and there is no technology to easily create and edit the avatar content.

SUMMARY

Provided are a method, a non-transitory computer-readable recording medium storing instructions, and a system (e.g., apparatus) for creating an avatar content for solving the above problems.

According to an aspect of the disclosure, a method for creating avatar content may include receiving, from a user, a first user input selecting a first content including time-series actions of a first avatar and a second avatar, displaying a first user interface for selecting one of the first avatar and the second avatar in the first content, receiving, from the user through the first user interface, a second user input selecting the first avatar, and in response to the receiving the second user input, generating a user-customized content by adding, to the first content, a third avatar associated with the user that performs a same action as the selected first avatar.

A set of items applied to the selected first avatar in the user-customized content may be applied to the third avatar.

The first avatar may be removed from the user-customized content, and the third avatar may be displayed instead of the first avatar.

The user-customized content may include a set of time-series actions, the set of time-series actions including time-series actions of the first avatar, the second avatar, and the third avatar, the third avatar may perform the same action as the first avatar in the user-customized content, and a set of items applied to the first avatar may be applied to the third avatar.

The second avatar may perform a different action from the first avatar and the third avatar in the user-customized content.

The method may include displaying a second user interface for editing the set of time-series actions included in the user-customized content, where the second user interface may include slots corresponding to each of the time-series actions of the set of time-series actions, and each slot may represent a preview of each action.

The method may include receiving, from the user through the second user interface, a third user input to change a first action included in the set of time-series actions to a second action, and in response to receiving the third user input, changing the second avatar and the third avatar from performing the first action to performing the second action in the user-customized content.

The method may include receiving, from the user through the second user interface, a fourth user input to add a third action to the set of time-series actions, and in response to receiving the fourth user input, adding a scene in which the second avatar and the third avatar perform the third action to the user-customized content.

The method may include displaying a third user interface for editing a background image in the user-customized content, receiving, from the user through the third user interface, a fifth user input to change the background image from a first image to a second image, and in response to receiving the fifth user input, changing the background image in the user-customized content from the first image to the second image.

The method may include displaying a fourth user interface for editing a background music in the user-customized content, receiving, from the user through the fourth user interface, a sixth user input to change the background music from a first music to a second music, and based on receiving the sixth user input, changing the background music in the user-customized content from the first music to the second music.

The method may include, in response to the background music in the user-customized content being changed from the first music to the second music, displaying a fifth user interface that suggests to change a first action to a second action associated with the second music.

According to an aspect of the disclosure, a non-transitory computer-readable recording medium may store instructions that, when executed by one or more processors, cause the one or more processors to receive, from a user, a first user input selecting a first content including time-series actions of a first avatar and a second avatar, display a first user interface for selecting one of the first avatar and the second avatar in the first content, receive, from the user through the first user interface, a second user input selecting the first avatar, and in response to the receiving the second user input, generate a user-customized content by adding, to the first content, a third avatar associated with the user that performs a same action as the selected first avatar.

According to an aspect of the disclosure, an information processing system may include at least one memory storing instructions, and at least one processor configured to execute the instructions to receive, from a user terminal, information on a first content including time-series actions of a first avatar and a second avatar, receive, from the user terminal, information on the first avatar, among the first avatar and the second avatar in the first content, receive, from the user terminal, information on a third avatar associated with a user, and generate a user-customized content by adding the third avatar performing a same action as the first avatar to the first content.

A set of items applied to the first avatar in the user-customized content may be applied to the third avatar.

The first avatar may be removed from the user-customized content, and the third avatar may be displayed instead of the first avatar.

The user-customized content may include a set of time-series actions, the set of time-series actions including time-series actions of the first avatar, the second avatar, and the third avatar, the third avatar may perform the same action as the first avatar in the user-customized content, and a set of items applied to the first avatar may be applied to the third avatar.

The at least one processor may be further configured to execute the instructions to receive, from the user terminal, a request to change a first action included in the time-series actions to a second action, and changing the second avatar and the third avatar from performing the first action to performing the second action in the user-customized content.

The at least one processor may be further configured to execute the instructions to receive, from the user terminal, a request to add a third action to the time-series actions, and add a scene in which the second avatar and the third avatar perform the third action to the user-customized content.

The at least one processor may be further configured to execute the instructions to receive, from the user terminal, a request to change a background image in the user-customized content from a first image to a second image, and charge the background image in the user-customized content from the first image to the second image.

The at least one processor is further configured to execute the instructions to receive, from the user terminal, a request to change a background music from a first music to a second music, change the background music in the user-customized content from the first music to the second music, and transmit, to the user terminal, a message suggesting to change a first action included in the time-series actions to a second action associated with the second music.

The effects of the present disclosure are not limited to the effects described above, and other effects not described herein may be clearly understood by those of ordinary skill in the art from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
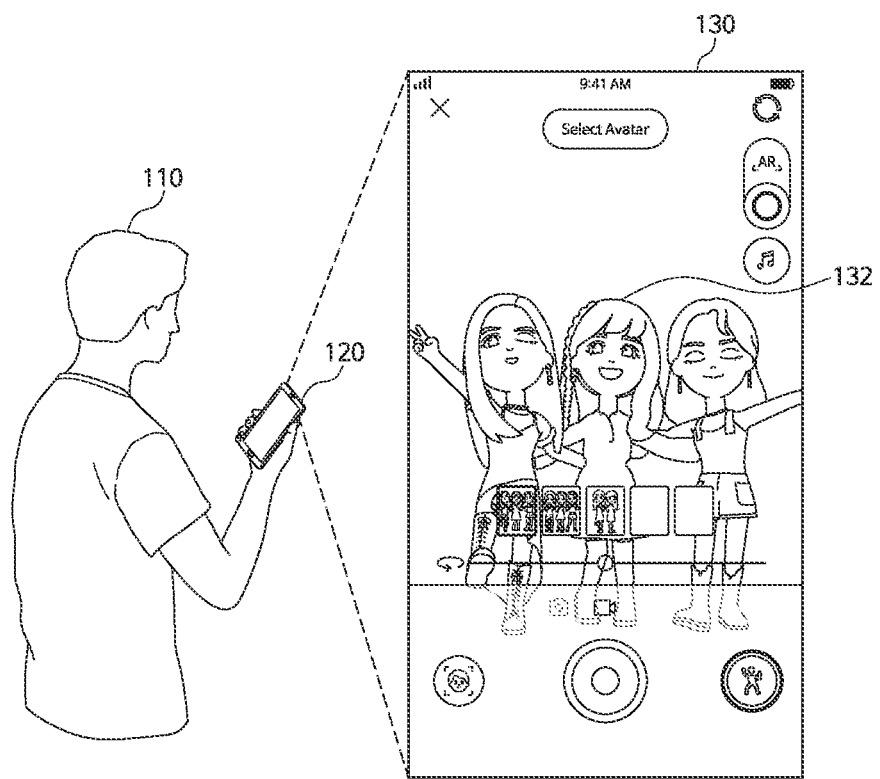
FIG. 1 is a diagram of an example in which an avatar content creation service is provided through an application operating in a user terminal according to an embodiment.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any embodiment.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor may read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, a "user" may refer to a user of an avatar content creation application or a user account in the avatar content creation application. In this example, the user account may represent an account created and used by the user in the avatar content creation application or data related thereto.

In the present disclosure, an "avatar" may be a character representing a user in a virtual environment, and may be defined by an eye shape, a nose shape, a mouth shape, a face shape, a body type, a hair style, and the like.

In the present disclosure, an "item" may refer to clothes, shoes, glasses, accessories, and the like applicable to the avatar.

In the present disclosure, an "action of an avatar" or "time-series actions of an avatar" may refer to movements that may be expressed with body parts (head, arms, legs, torso, joints, and the like) of the user avatar. In some examples, the "action of the avatar" may include not only a dynamic action such as a motion, a choreography, and the like, but also a static action such as a pose, a facial expression, and the like.

In the present disclosure, the "machine learning model" may include any model that is used for inferring an answer to a given input. The machine learning model may include an artificial neural network model including an input layer, a plurality of hidden layers, and an output layer. Each layer may include a plurality of nodes.

In the present disclosure, a "display" may refer to any display device associated with a computing device, and for example, it may refer to any display device that is controlled by the computing device, or that may display any information/data provided from the computing device.

According to some examples, it is possible to create a user-customized content by simply editing the existing avatar content, and as a result, users may easily and conveniently create the content they want.

According to some examples, by replacing the avatar included in the existing avatar content with user's own avatar or adding the user's own avatar to the existing avatar content, users may easily create the content they want.

According to some examples, it is possible to easily edit the actions performed by the avatars included in the content using a list of actions, and slots, and as a result, it is possible to easily control the actions of avatars in the content.

According to some examples, if the background music included in the existing avatar content is changed, an action suitable for the changed music is suggested, and as a result, users may easily create the content including the action suitable for the music.

FIG. 1 is a diagram of an example in which an avatar content creation service is provided through an application operating in a user terminal 120 according to an embodiment. A content 130 may include one or more avatars and time-series actions performed by each of the one or more avatars. The avatar 132 included in the content 130 may be wearing various items, and the content 130 may include a background music, a background image (or background video), and the like. The user 110 may use the user terminal 120 to edit the content 130 and create a user-customized content. For example, the user 110 may create avatar content by editing the avatar 132 included in the existing content 130, the items worn by the avatar, the actions, the background image, the background music, and the like.

FIG. 1 illustrates an example of a content editing screen displayed on the user terminal 120. The content editing screen may include a plurality of slots, and each slot may correspond to each of time-series actions included in the content 130. The content 130 may be played as the avatars included in the content 130 sequentially perform actions corresponding to each slot. For example, the content 130 may be played as three avatars included in the content 130 perform three actions corresponding to three slots in order. If the content 130 includes the background image and/or the background music, the background image (or background video) and the background music may be played together. The user terminal or the information processing system may add an intermediate action between each of the actions performed by the avatars included in the content 130 so as to naturally connect each of the actions. For example, if a first action ends with the avatar in such a posture that its arms are raised and a second action starts with the avatar in such a posture that its arms are lowered down, the user terminal or the information processing system may add, between the first action and the second action, an action in which the avatar starts with its arms raised and then ends with its arms lowered down.

The user may add a new avatar to the content 130. For example, the user may add to the content 130 a second avatar performing the same action as the first avatar 132, or replace the first avatar 132 with a second avatar performing the same action as the first avatar 132. The second avatar may be an avatar associated with the user, and the same item applied to the first avatar 132 may be applied to the second avatar. An example in which the user adds a new avatar to the content 130 will be described in detail below with reference to FIGS. 5 and 9.

The user may change the background image in the content 130, the background music and/or the item applied to the avatar in the content 130. For example, the user terminal may display a user interface for editing background image, a user interface for editing background music, and a user interface for editing item applied to an avatar, and change the background image, the background music and/or the items in the content 130 through such interface. If the background music is changed, the user terminal or the information processing system may suggest to change part of the actions included in the content 130 to actions more suitable for the changed background music. An example in which the user changes the background image, the background music, and/or the item applied to the avatar in the content 130 will be described in detail below with reference to FIGS. 6 and 7.

The user may edit at least part of the time-series actions included in the content. For example, the user terminal may display a user interface for editing action, and the user may delete some of the actions included in the content 130 through the user interface for editing action, change to another actions, add a new action to the content 130, or change the order of the time-series actions included in the content 130. If at least part of the actions in the content 130 is edited, the user terminal or the information processing system may also edit the intermediate actions between the respective actions. For example, if a second action between the first to third actions is deleted, the user terminal or the information processing system may delete a first intermediate action added between the first action and the second action, a second intermediate action added between the second action and the third action, and add a third intermediate action between the first action and the third action to naturally connect the first action and the third action.

As described above, the user 110 may use the user terminal 120 to edit the content 130 and create a user-customized content. The user 110 may store the created content (or a portion thereof) in the user terminal 120 or upload it to an online community, a content sharing site, a social network service, and the like through a network, thereby sharing the created user-customized content with other users.

Figure 2:
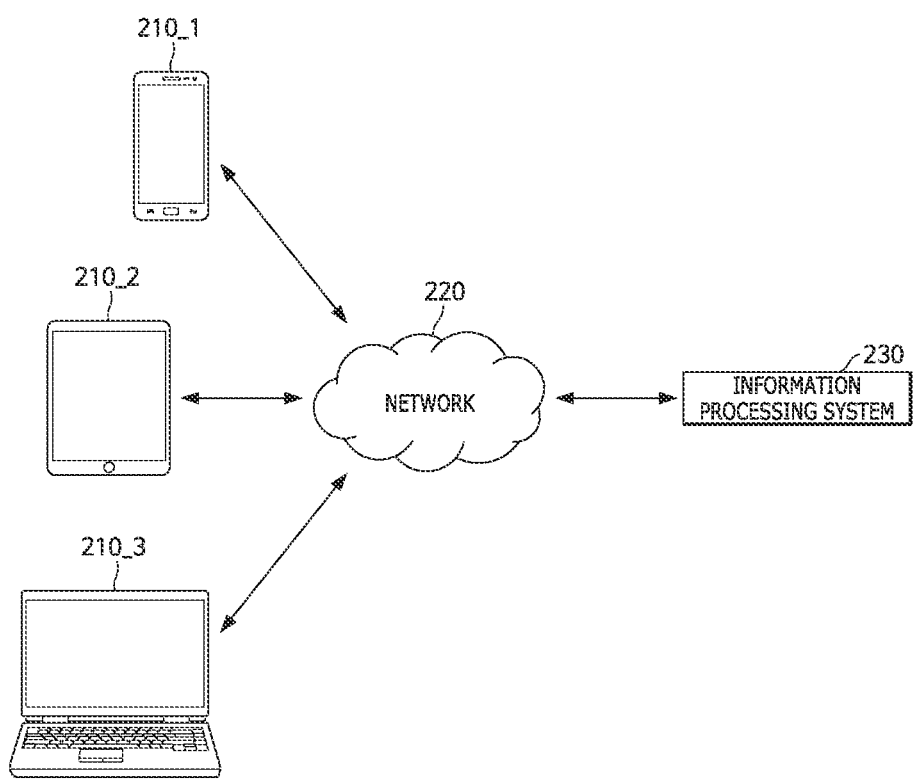
FIG. 2 is a diagram of a configuration in which an information processing system is communicatively connected to a plurality of user terminals in order to provide an avatar content creation service according to an embodiment.

FIG. 2 is a diagram of a configuration in which an information processing system 230 is communicatively connected to a plurality of user terminals 210_1, 210_2, and 210_3 to provide the avatar content creation service according to an embodiment. As illustrated, the plurality of user terminals 210_1, 210_2, and 210_3 may be connected through a network 220 to the information processing system 230 that is capable of providing the avatar content creation service. The plurality of user terminals 210_1, 210_2, and 210_3 may include terminals of users who receive the avatar content creation service. The information processing system 230 may include a system(s) capable of providing the avatar content creation service through the network 220. The information processing system 230 may include one or more server devices and/or databases, or one or more distributed computing devices and/or distributed databases based on cloud computing services, which may store, provide and execute computer-executable programs (e.g., downloadable applications) and data associated with the avatar content creation. For example, the information processing system 230 may include separate systems (e.g., servers) for providing the avatar content creation service.

The avatar content creation service provided by the information processing system 230 may be provided to the user through the avatar content creation application, a web browser or the like installed in each of the plurality of user terminals 210_1, 210_2, and 210_3.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2, and 210_3.

In FIG. 2, a mobile phone terminal 210_1, a tablet terminal 210_2, and a PC terminal 210_3 are illustrated as the examples of the user terminals, but aspects are not limited thereto, and the user terminals 210_1, 210_2, and 210_3 may be any computing device that is capable of wired and/or wireless communication and that may be installed with the avatar content creation application and so on and execute the same. For example, the user terminal may include a smartphone, a mobile phone, a navigation system, a computer, a notebook computer, a digital broadcasting terminal, personal digital assistants (PDA), a Portable multimedia player (PMP), a tablet PC, a game console, a wearable device, an Internet of Things (IoT) device, a virtual reality (VR) device, an augmented reality (AR) device, and the like. In addition, while FIG. 2 illustrates that three user terminals 210_1, 210_2, and 210_3 are in communication with the information processing system 230 through the network 220, aspects are not limited thereto, and a different number of user terminals may be configured to be in communication with the information processing system 230 through the network 220.

The information processing system 230 may receive, from the user terminals 210_1, 210_2, and 210_3, information on a content including time-series actions of the first and second avatars. In addition, the information processing system 230 may receive, from the user terminals 210_1, 210_2, and 210_3, information on the first avatar, among the first and second avatars in the content. The information processing system 230 may receive the information on the content and the information on the first avatar through the avatar content creation application installed in the user terminals 210_1, 210_2, and 210_3. The information processing system 230 may add the third avatar performing the same action as the first avatar to the content to create a user-customized content.

Figure 3:
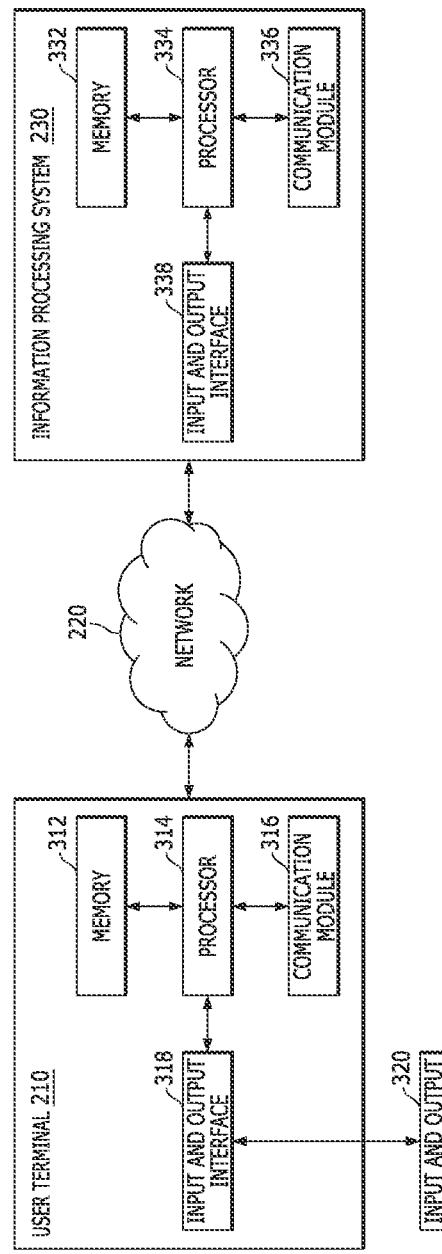
FIG. 3 is a block diagram illustrating an internal configuration of the user terminal and the information processing system according to an embodiment.

FIG. 3 is a block diagram illustrating an internal configuration of the user terminal 210 and the information processing system 230 according to an embodiment. The user terminal 210 may refer to any computing device that is capable of executing the avatar content creation application and so on and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data created from the user terminal 210 through the input and output interface 318.

The memories 312 and 332 may include any non-transitory computer-readable recording medium. The memories 312 and 332 may include a permanent mass storage device such as RAM, ROM, disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and one or more program codes (e.g., a code for the instant messaging application, and the like installed and driven in the user terminal 210) may be stored in the memories 312, 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a digital versatile disc (DVD)/compact disc (CD)-ROM drive, a memory card, and so on, for example. As another example, the software components may be loaded into the memories 312 and 332 through the communication modules 316 and 336 rather than the computer-readable recording medium. For example, one or more programs may be loaded into the memories 312 and 332 based on a computer program (e.g., an application that provides an avatar content creation service) installed by files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to create user-customized content, a request to change action, and the like) generated by the processor 314 of the user terminal 210 according to the program code stored in the recording device such as the memory 312 and the like may be sent to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220. For example, the user terminal 210 may receive the created/edited user-customized content, a message to recommend change of action, and the like from the information processing system 230.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting.

While FIG. 3 illustrates that the input and output device 320 is not included in the user terminal 210, aspects are not limited thereto, and an input and output device 240 may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a global positioning system (GPS) module, a camera, various sensors, a database, and the like. For example, if the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, and so on are further included in the user terminal 210.

The processor 314 of the user terminal 210 may be configured to operate an avatar content creation application or a web browser application that provides the avatar content creation service. The program code associated with the corresponding application may be loaded into the memory 312 of the user terminal 210. While the application is running, the processor 314 of the user terminal 210 may receive information and/or data provided from the input and output device 320 through the input and output interface 318 or receive the information and/or data from the information processing system 230 through the communication module 316, and process the received information and/or data and store it in the memory 312. In addition, such information and/or data may be provided to the information processing system 230 through the communication module 316.

While the avatar content creation application is running, the processor 314 may receive voice data, text, image, video, and the like input or selected through the input device such as a camera, a microphone, and the like that includes a touch screen, a keyboard, an audio sensor and/or an image sensor connected to the input and output interface 318, and store the received voice data, text, image, and/or video or the like in the memory 312, or provide it to the information processing system 230 through the communication module 316 and the network 220. The processor 314 may receive, through the input device, a user input to select a content and a user input to select a first avatar in the content, and provide the corresponding data/request to the information processing system 230 through the network 220 and the communication module 316.

The processor 334 of the information processing system 230 may be configured to manage, process, and/or store the information and/or data received from a plurality of user terminals and/or a plurality of external systems. The processor 334 may store, process, and transmit content selection information, first avatar selection information, and the like received from the user terminal 210. For example, the processor 334 may create a user-customized content by adding a third avatar performing the same action as the first avatar in the received content.

Figure 4:
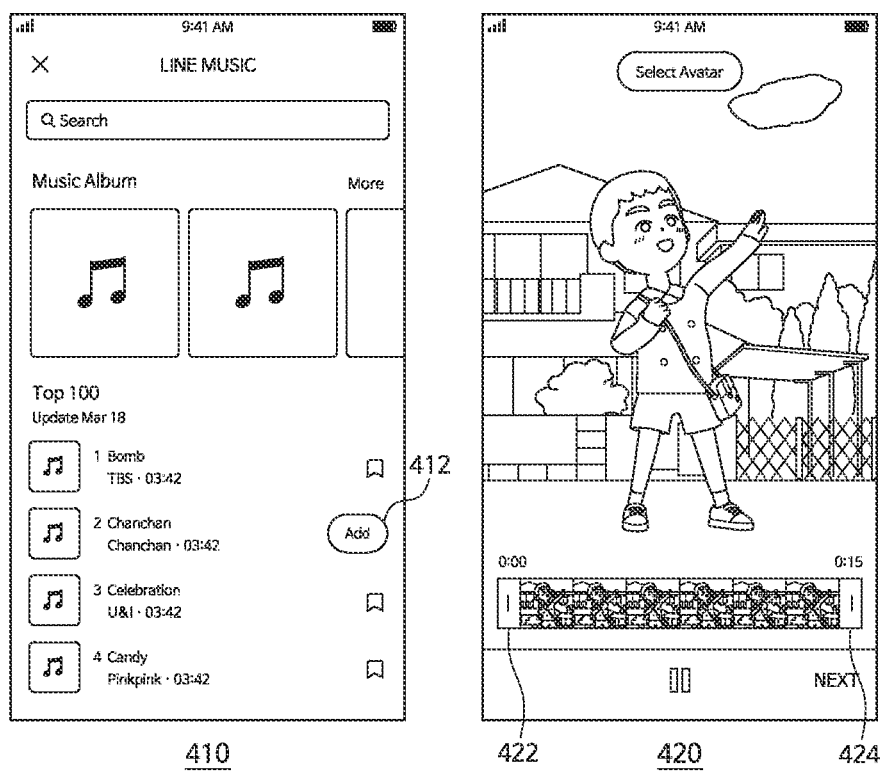
FIG. 4 is a diagram of an example of a method for selecting a content according to an embodiment.

FIG. 4 is a diagram of an example of a method for selecting a content according to an embodiment. The user may select one or some of a plurality of contents through a first operation 410 and a second operation 420. The user may create a user-customized content based on the selected content(s).

The first operation 410 represents an example in which the user selects one of a plurality of contents on a content selection screen. For example, the content selection screen may include a list of a plurality of contents. A content may include one or more avatars, and time-series actions performed by each of the one or more avatars. The avatar included in the content may wear various items, and the content may include a background music, a background image (or a background video), and the like. As illustrated, the user may click or touch "Chanchan" among a plurality of contents on the content selection screen, and click or touch a displayed "Add" button 412 to select the content as the basis for creating a user-customized content.

The second operation 420 represents an example in which the user selects a portion of the selected content. For example, as illustrated, the content selected in the user terminal may be played. By dragging and dropping a start bar 422 and/or an end bar 424, the user may appropriately adjust a start and/or an end and thus select a portion of the selected content to be used for creating a user-customized content. After selecting a portion to be used, the user may click or touch a "Next" button to create a user-customized content based on the selected portion.

Figure 5:
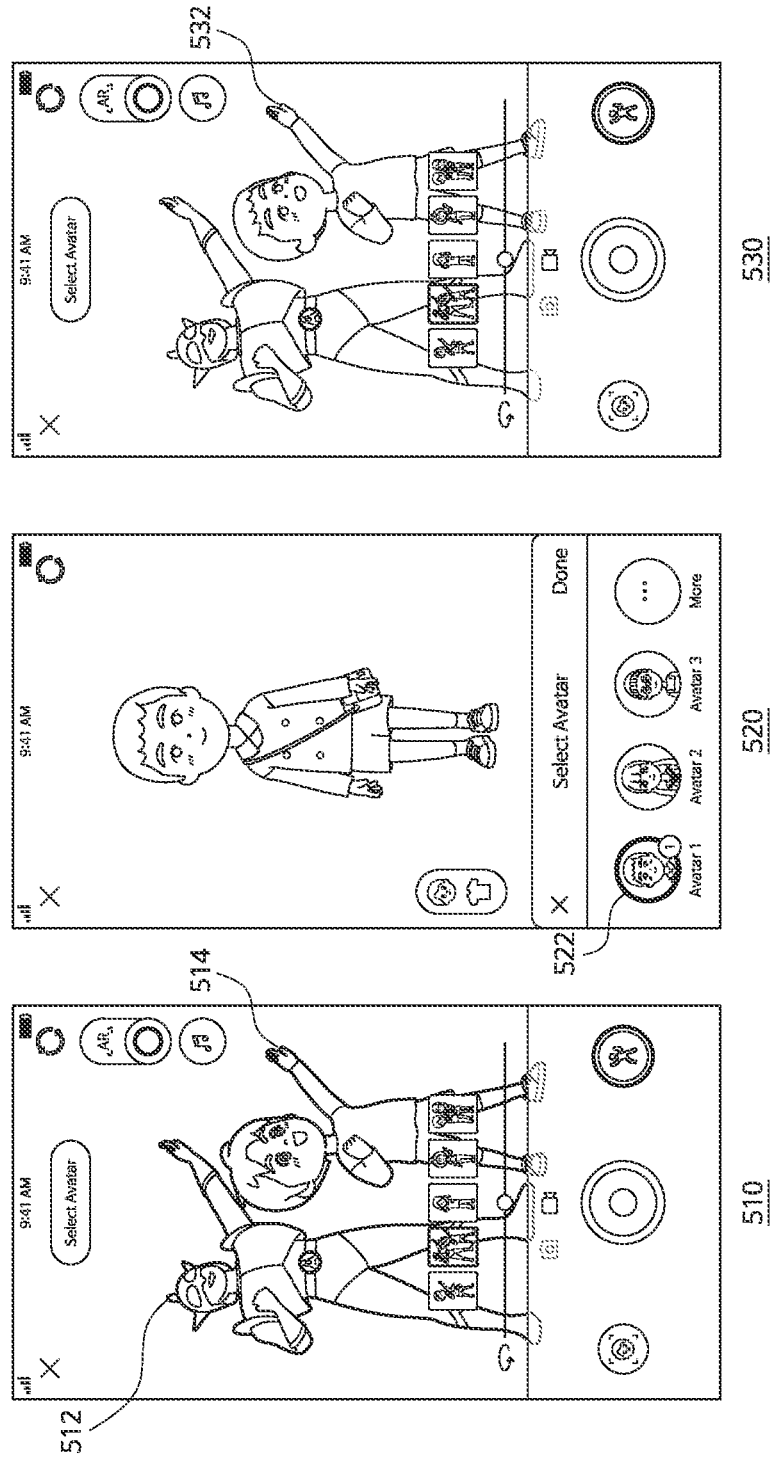
FIG. 5 is a diagram of an example of a method for adding an avatar associated with a user to a content according to an embodiment.

FIG. 5 is a diagram an example of a method for adding an avatar associated with the user to the content according to an embodiment. As illustrated, one or more avatars included in the content may be displayed on a content editing screen. Each of the avatars in the content may perform time-series actions included in the content. Each of the avatars may perform the same action as each other, or perform the partially same action, or perform different action. Through first to third operations 510, 520, and 530, the user may select an avatar in the content and replace the selected avatar with another avatar (e.g., an avatar of the user) that acts identically to the selected avatar.

The first operation 510 represents an example in which the user selects one avatar 514 between avatars 512 and 514 in the content. For example, the user may select one of the first avatar 512 and the second avatar 514 in the content displayed on the user terminal. A thick line may be displayed along the borders of the first avatar 512 and the second avatar 514, indicating that the avatars 512 and 514 are selectable. The user may click or touch the second avatar 514 to select the second avatar 514 as an avatar to be replaced.

The second operation 520 represents an example in which the user selects his/her own avatar to be added to the content. For example, a user interface for adding an avatar may be displayed on the user terminal. The user interface for adding an avatar may include a list of one or more avatars. The one or more avatars may include an avatar associated with the user (e.g., an avatar stored in association with a user account, an avatar created by the user, and the like). The user may select one avatar 522 (third avatar) from the avatar list by clicking or touching, and click or touch a "Done" button to select the third avatar 522 as an avatar to be added to the content.

Although FIG. 5 illustrates that the avatar in the content is selected, it may be different in some other implementations. Accordingly, in another example, if at least one of characters associated with the content is selected by the user, a set of items stored in association with the character may be applied to the avatar of the user.

In addition, although FIG. 5 illustrates that the third avatar 522 to be added to the content is selected from among the previously stored user avatars, it may be different in some other implementations. For example, the user may create a new avatar by using an avatar creation tool provided in the avatar content creation application or the like, and add the created avatar to the content. As another example, the user may capture an image of the user with the camera of the user terminal, or select a photo stored in the user terminal, and the user terminal or the information processing system may create an avatar similar to a person, an animal, and the like included in the photo based on the captured or selected photo by using an avatar creation model (e.g., a machine learning model). The user may add the avatar created as described above to the content.

The third operation 530 represents an example in which the user avatar selected by the user is added to the content. For example, as illustrated, the second avatar 514 may be removed from the content, and a third avatar 532 performing the same action as the second avatar 514 may be added in its place. The same set of items (clothes, shoes, accessories, and the like) as the set of items applied to the second avatar 514 in the content may be applied to the third avatar 532. The set of items may include at least one of the items applied to the second avatar 514, and may be stored in association with a character corresponding to the second avatar. While FIG. 5 illustrates that the clothes and shoes of the second avatar 514 are applied identically to the third avatar 532, aspects are not limited thereto, and it may be different in some other implementations. For example, in addition to the clothes, shoes, and accessories of the second avatar 514, hair and the like may also be applied identically to the third avatar 532.

FIG. 5 and the above description are merely examples, and may be implemented differently in some other examples. For example, in FIG. 5, it is illustrated that the second avatar 514 is replaced with the third avatar 532, but in some examples, the second avatar 514 may be included in the content as it is, and the third avatar 532 that acts identically to the second avatar 514 may be newly added. An example in which an existing avatar is maintained and a new avatar is added to the content will be described in detail below with reference to FIG. 9.

Figure 6:
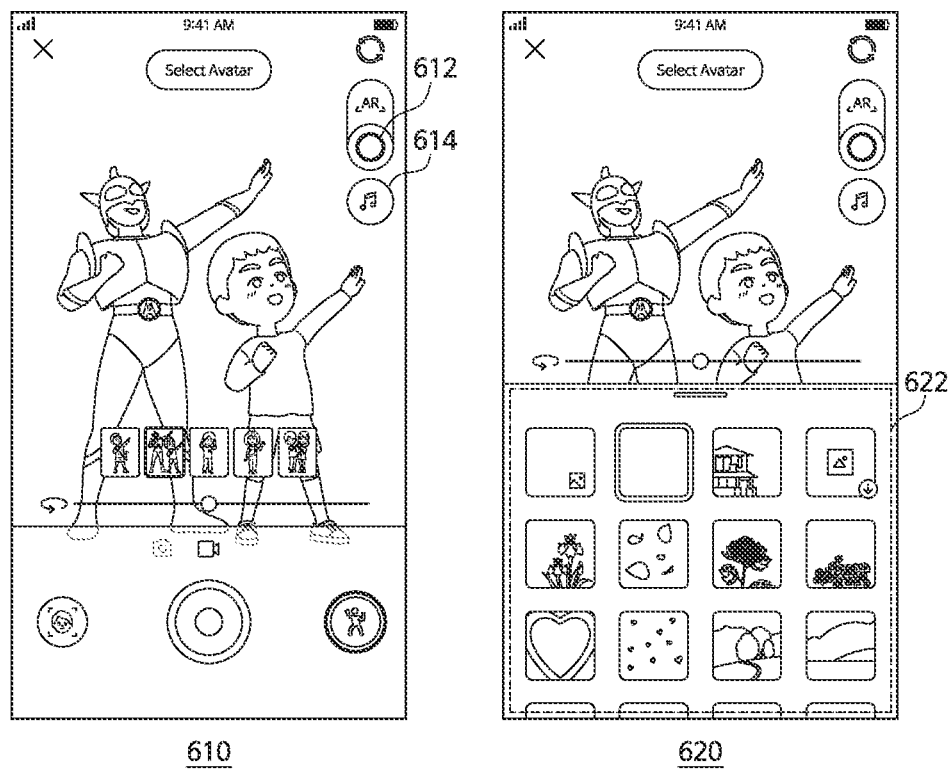
FIG. 6 is a diagram of an example of a method for changing a background image and/or a background music in a content according to an embodiment.

FIG. 6 is a diagram of an example of a method for changing a background image and/or a background music in the content according to an embodiment. The content may include at least one background image and/or at least one background music. The background image may include a background video, and the background video may be a video (e.g., a music video) including the background music. As illustrated in FIG. 6, the content editing screen displayed on the user terminal may include a background image change button 612 and a background music change button 614.

The user may change the background image in the content through a first operation 610 and a second operation 620. The first operation 610 represents an example in which the user clicks or touches the background image change button 612. For example, the user may click or touch the background image change button 612 displayed on the content editing screen to enter a user interface 622 for changing the background image.

The second operation 620 represents an example in which the user interface 622 for changing the background image is displayed on the user terminal. The user interface 622 for changing the background image may include a list of selectable background images (or background videos). The user may select one of the background images (or background videos) in the list by clicking or touching to change the background image in the content to the selected background image. The user may change the background image (or background video) to be used for the entirety of the content, or alternatively, may change the background image (or the background video) to be used for a certain portion of the content.

The user may change the background music for the entirety or for a certain portion of the content. For example, if the user clicks or touches the background music change button 614 displayed on the content editing screen, the user terminal may display a user interface (not illustrated) for changing the background music. The user may select one of the list of selectable background music included in the user interface for changing the background music to change the background music in the content to the selected background music. In addition to changing the background music, the user may also add sound effects to the entirety or for a certain portion of the content.

Additionally, if the background music of the entirety or for a certain portion of the content is changed (including a case when the background music is changed with change of a background video that includes the background music), the user terminal or the information processing system may suggest to change at least one of the actions included in the content. For example, the user terminal may display a user interface that suggests to change a first action in a first portion of the content to a second action associated with the changed background music of the first portion. The second action may be an action more suitable for the changed background music compared to the first action.

The action associated with a specific background music may be directly set by a provider, an operator, a manager, or the like of the avatar content creation service, or determined through avatar content creation data of the users of the avatar content creation service. For example, the background music of the first portion may be set in association with the second action by the operator, the manager, or the like of the avatar content creation service. As another example, if users create a plurality of avatar contents by matching the background music of the first portion with the second action, the background music of the first portion may be set in association with the second action. As another example, the action associated with the background music of a specific portion of the content may be determined by using a music-action matching model. Specifically, the music-action matching model may be a supervised machine learning model based on training data including a plurality of music data-action data pairs (e.g., a data pair directly set by the operator, the manager, or the like of the avatar content creation service, or a data pair created with users' avatar content creation data, and the like). The user terminal or the information processing system may use the music-action matching model to determine a matching rate between the background music of the first portion and the first action included in the first portion. If the matching rate is lower than a predefined threshold, the user terminal or the information processing system may suggest to change to a second action that has a matching rate with the background music of the first portion equal to or higher than the predefined threshold. The user may review the suggestion to change the action according to the background music change, and determine whether or not to change the first action in the content to the suggested second action.

Figure 7:
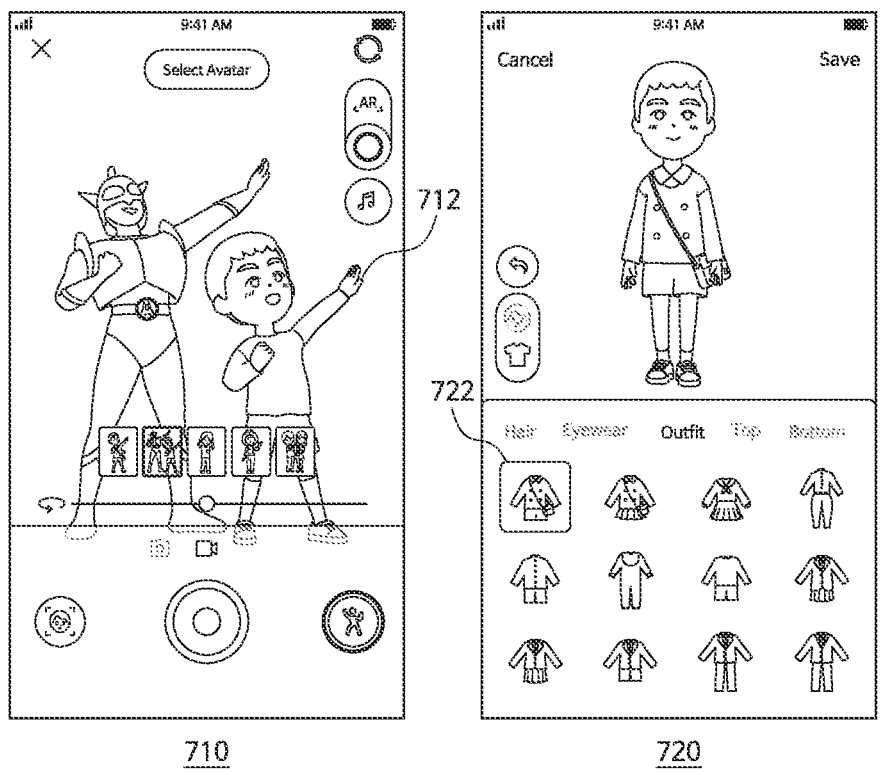
FIG. 7 is a diagram of an example of a method for changing an item applied to an avatar in a content according to an embodiment.

FIG. 7 is a diagram of an example of a method for changing an item applied to the avatar in the content according to an embodiment. The user may change the item applied to one or more avatars in the content through a first operation 710 and a second operation 720. The item may refer to clothes, shoes, glasses, accessories, and the like applicable to the avatar.

The first operation 710 represents an example in which the user selects an avatar to change an item for. For example, the user may click or touch a first avatar 712 of the one or more avatars in the content to select a target avatar for which to change an item.

The second operation 720 represents an example in which the user selects an item to be applied to the selected avatar. For example, as illustrated, a user interface for previewing the selected first avatar 712 and changing the item may be displayed on the user terminal. The user interface for changing the item may include a list of items applicable to the first avatar. If the user touches or clicks a first item 722 in the list of items, a preview may be displayed on the user terminal as illustrated, in which the first item 722 is applied to the first avatar. The user may click or touch a "Save" button in the right upper corner to apply the first item 722 to the first avatar 712 in the content. Alternatively, the user may click or touch a "Cancel" button in the left upper corner to cancel the change of the item. If the user changes the clothing item of the first avatar 712 in the content to the first item 722 by clicking or touching the "Save" button in the upper right corner, the user terminal may display a screen in which the first avatar wearing the first item 722 performs the time-series actions included in the content.

Figure 8:
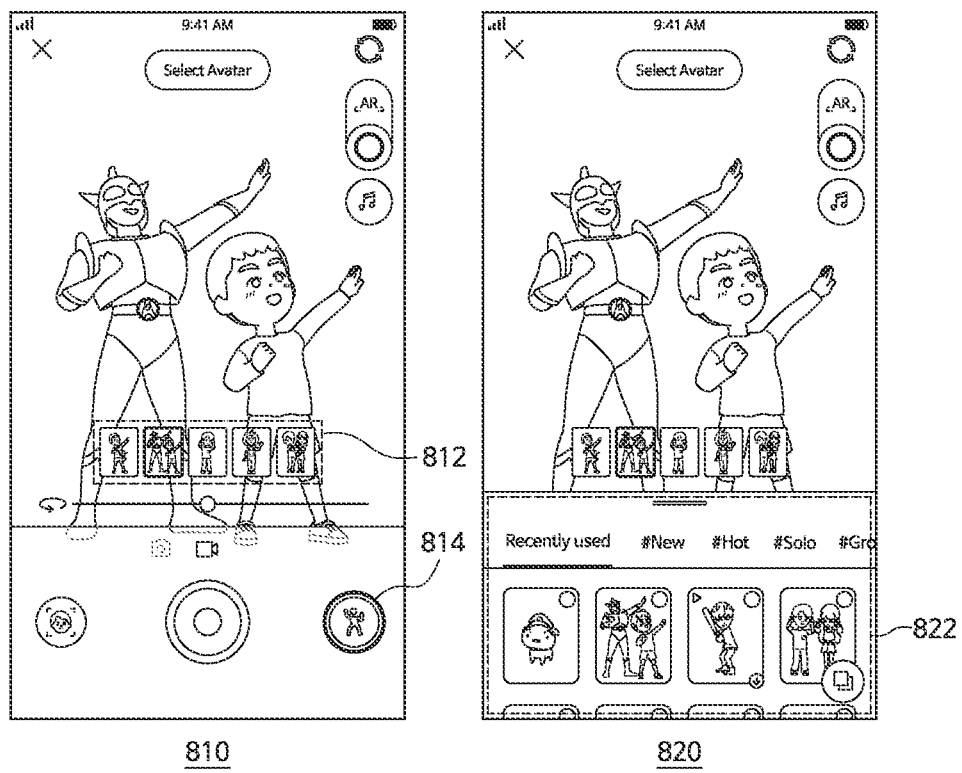
FIG. 8 is a diagram of an example of a method for editing at least part of time-series actions included in a content according to an embodiment.

FIG. 8 is a diagram of an example of a method for editing at least part of the time-series actions included in the content according to an embodiment. As illustrated, one or more slots 812 may be displayed on the content editing screen. Each slot (or action slot) may correspond to each of one or more time-series actions in the content, and each slot may include a preview (e.g., thumbnail) of the corresponding action.

The user may change part of time-series actions in the content through a first operation 810 and a second operation 820. The first operation 810 represents an example in which the user selects a slot corresponding to an action to be changed. For example, the user may select the corresponding slot by touching or clicking a second slot of the five slots 812. If the user selects the second slot, the user terminal may display a scene in which avatars in the content perform an action corresponding to the second slot. With the second slot selected, the user may touch or click an action edit button 814 to select the second slot as a target slot to change.

The second operation 820 represents an example in which the user selects an action to change to. For example, a list 822 of changeable actions may be displayed on the user terminal. The user may select one or more actions from the list 822 to replace the action corresponding to the second slot with the selected action(s). Previews of respective actions may be displayed in the list of changeable actions.

The user may add a new action to the content. The process of adding a new action to the content may be performed similarly to the process of changing an action described above. For example, the user may touch or click the action edit button 814 without selecting any of the five slots 812. In this example, the list 822 of actions that may be added may be displayed on the user terminal, and the user may select one or more actions from the list 822 to add the selected action(s) to the content.

The user may delete part of the actions in the content or change the order of the actions. For example, if the user touches and holds a portion where the slots 812 are displayed, a user interface for deleting an action or changing an order of actions may be displayed. The user may touch a delete button displayed on each slot to delete each slot, thereby deleting an action corresponding to each slot from the content. In addition, the user may drag and drop each slot to a desired position to change the order of actions corresponding to each slot.

FIG. 8 illustrates that the user adds an action to the content or changes an action in the content by selecting one of the action lists, but aspects are not limited thereto. For example, in some examples, the user may create a new action using an action creation tool provided in the avatar content creation application, and the like, and add the created action to the content, or change the action in the content to the created action. As another example, the user may capture an image of the action of the user with the camera of the user terminal or select a photo or video stored in the user terminal, and the user terminal or information processing system may create an action similar to an action included in the photo or video based on the captured or selected photo or video by using an action creation model (e.g., a machine learning model). The user may add the action created as described above to the content.

Figure 9:
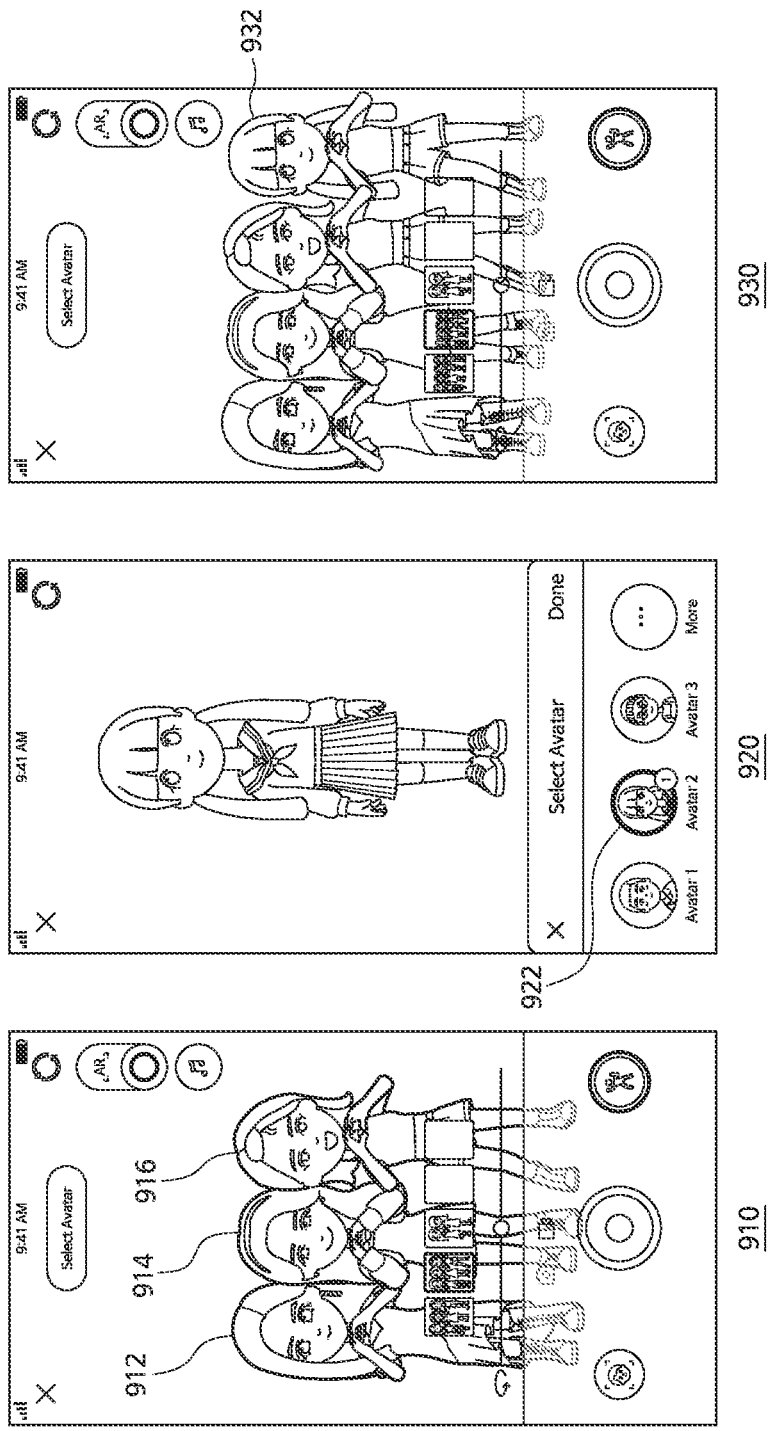
FIG. 9 is a diagram of an example of a method for adding an avatar associated with a user to a content according to an embodiment.

FIG. 9 is a diagram of an example of a method for adding an avatar associated with the user to the content according to an embodiment. Through first to third operations 910, 920, and 930, the user may select an avatar in the content of the content and add another avatar (e.g., an avatar of the user) that acts identically to the selected avatar to the content.

The first operation 910 represents an example in which the user selects one 916 of avatars 912, 914, and 916 in the content. For example, the user may select one of first to third avatars 912, 914, and 916 in the content displayed on the user terminal. A thick line may be displayed along the borders of the first to third avatars 912, 914, and 916, indicating that the avatars are selectable. For example, the user may click or touch the third avatar 916 to select the same.

The second operation 920 represents an example in which the user selects his/her own avatar to be added to the content. For example, a user interface for adding an avatar may be displayed on the user terminal. The user interface for adding an avatar may include a list of one or more avatars. The one or more avatars may include an avatar associated with the user (e.g., an avatar stored in association with a user account, an avatar created by the user, and the like). The user may select one avatar 922 (fourth avatar) from the avatar list by clicking or touching, and click or touch a "Done" button to select the fourth avatar 922 as an avatar to be added to the content.

Although FIG. 9 illustrates that the fourth avatar 922 to be added to the content is selected from among the previously stored user avatars, it may be different in some other implementations. For example, the user may create a new avatar by using an avatar creation tool provided in the avatar content creation application or the like, and add the created avatar to the content. As another example, the user may capture an image of the user with the camera of the user terminal, or select a photo stored in the user terminal, and the user terminal or the information processing system may create an avatar similar to a person, an animal, and the like included in the photo based on the captured or selected photo by using an avatar creation model (e.g., a machine learning model). The user may add the avatar created as described above to the content.

The third operation 930 represents an example in which the user avatar selected by the user is added to the content. For example, as illustrated, a fourth avatar 932 performing the same action as the third avatar 916 may be added to the content. The same set of items (clothes, shoes, accessories, and the like) as the set of items applied to the third avatar 916 in the content may be applied to the fourth avatar 932. While FIG. 9 illustrates that the clothes and shoes of the third avatar 916 are applied identically to the fourth avatar 932, aspects are not limited thereto, and it may be different in some other implementations. For example, in addition to the clothes, shoes, and accessories of the third avatar 916, hair and the like may also be applied identically to the fourth avatar 932.

Figure 10:
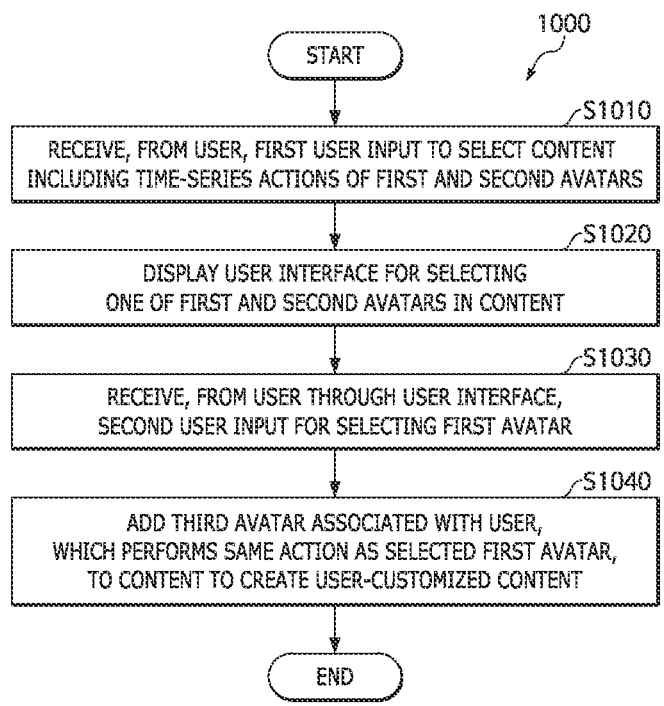
FIG. 10 is a flowchart provided to explain an example of a method for creating an avatar content according to an embodiment.

FIG. 10 is a flowchart illustrating an example of a method 1000 for creating an avatar content according to an embodiment. The method 1000 may be initiated by one or more processors of the user terminal receiving, from the user, a first user input to select a content including time-series actions of the first and second avatars, in operation S1010. The content may include one or more avatars, a plurality of time-series actions of the one or more avatars, a background image, a background music, and the like.

The processor may display a first user interface for selecting one of the first and second avatars in the content, in operation S1020, and receive, from the user through the first user interface, a second user input to select the first avatar, in operation S1030.

In response to receiving the second user input, the processor may add a third avatar associated with the user, which performs the same action as the selected first avatar, to the content to create a user-customized content, in operation S1040 (e.g., the processor may generate the user-customized content by adding the third avatar associated with the user, which performs the same action as the selected first avatar, to the content). By adding the third avatar to the content including the time-series actions of the first and second avatars, the user-customized content including the time-series actions of the first avatar, the second avatar, and the third avatar may be created or generated. The third avatar may perform the same action as the first avatar, and the second avatar may perform the action same as or different from the first and third avatars. Alternatively, the first avatar selected from the user-customized content may be removed, and the third avatar performing the same action as the first avatar may be displayed instead of the first avatar. In the user-customized content, at least one of the items applied to the selected first avatar may be applied identically to the third avatar associated with the user.

The processor may display a second user interface for editing time-series actions included in the user-customized content. The second user interface may include slots corresponding to each of the time-series actions, and each slot may represent a preview of each action. The processor may receive a user input to change the action from the user, and change at least part of the actions included in the user-customized content. For example, the processor may receive, from the user through the second user interface, a third user input to change the first action included in the time-series actions to the second action, and in response, the processor may change the second avatar and the third avatar from performing the first action to performing the second action in the user-customized content. Additionally or alternatively, the processor may receive a user input to add an action from the user and add the new action to the user-customized content. For example, the processor may receive, from the user through the second user interface, a fourth user input to add the third action to the time-series actions, and in response, the processor may add a scene in which the second avatar and the third avatar perform the third action to the user-customized content.

The processor may display a third user interface for editing a background image in the user-customized content. In addition, the processor may receive a user input to change the background image from the user, and change the background image in the user-customized content. For example, the processor may receive, from the user through the third user interface, a fifth user input to change the background image from the first image to the second image, and in response, the processor may change the background image in the user-customized content from the first image to the second image.

The processor may display a fourth user interface for editing the background music in the user-customized content. In addition, the processor may receive a user input to change the background music from the user, and change the background music in the user-customized content. For example, the processor may receive, from the user through the fourth user interface, a sixth user input to change the background music from a first music to a second music, and based on this, the processor may change the background music in the user-customized content from the first music to the second music.

Additionally, the processor may recommend or suggest actions associated with background music in the user-customized content. For example, in response to the background music in the user-customized content being changed from the first music to the second music, a fifth user interface may be displayed, suggesting to change the first action included in the time-series actions to the second action associated with the second music. The user may change (or request to change) the first action in the user-customized content to the suggested second action through the displayed fifth user interface.

The user-customized content created as described above may be stored in the user terminal by the user or uploaded to an online community, a content sharing site, a social network service, or the like through a network, and shared with other users.

Figure 11:
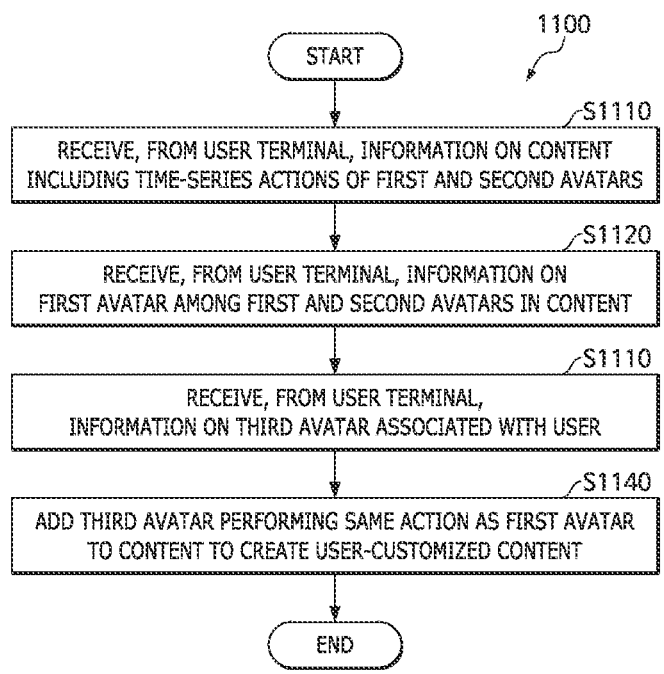
FIG. 11 is a flowchart provided to explain an example of a method for creating an avatar content according to an embodiment.

FIG. 11 is a flowchart illustrating an example of a method 1100 for creating an avatar content according to an embodiment. The method 1100 may be initiated by one or more processors of the information processing system receiving information on a content including time-series actions of first and second avatars from the user terminal, in operation S1110. The content may include one or more avatars, a plurality of time-series actions of the one or more avatars, a background image, a background music, and the like.

The processor may receive, from the user terminal, information on the first avatar, among the first and second avatars in the content, in operation S1120, and receive, from the user terminal, information on a third avatar associated with the user, in operation S1130.

The processor may add a third avatar performing the same action as the first avatar to the content to create a user-customized content, in operation S1140 (e.g., the processor ma generate the user-customized content by adding the third avatar performing the same action as the first avatar to the content). By adding the third avatar to the content including the time-series actions of the first and second avatars, the user-customized content including the time-series actions of the first avatar, the second avatar, and the third avatar may be created or generated. The third avatar may perform the same action as the first avatar, and the second avatar may perform the action same as or different from the first and third avatars. Alternatively, the first avatar may be removed from the user-customized content, and the third avatar performing the same action as the first avatar may be displayed instead of the first avatar. In the user-customized content, at least one of the items applied to the first avatar may be applied identically to the third avatar associated with the user. The user-customized content created as described above may be transmitted to the user terminal, and the user terminal may output the received user-customized content on a display.

The processor may receive a user input to change the action from the user terminal, and change at least part of the actions included in the user-customized content. For example, the processor may receive, from the user terminal, a request to change a first action included in the time-series action into a second action, and in response, the processor may change the second avatar and the third avatar from performing the first action to performing the second action in the user-customized content. Additionally or alternatively, the processor may receive a request to add an action from the user terminal, and add the new action to the user-customized content. For example, the processor may receive, from the user terminal, a request to add a third action to the time-series actions, and, in response, the processor may add a scene in which the second avatar and the third avatar perform the third action to the user-customized content. The user-customized content including the edited action may be transmitted to the user terminal and displayed on the display of the user terminal.

The processor may receive, from the user terminal, a request to change the background image and change the background image in the user-customized content. For example, the processor may receive, from the user terminal, a request to change the background image from the first image to the second image, and in response, the processor may change the background image in the user-customized content from the first image to the second image. The user-customized content with the changed background image may be transmitted to the user terminal and output on the display of the user terminal.

The processor may receive, from the user terminal, a request to change the background music, and change the background music in the user-customized content. For example, the processor may receive, from the user terminal, a request to change the background music from the first music to the second music, and based on this, the processor may change the background music in the user-customized content from the first music to the second music. The user-customized content with the changed background music may be transmitted to the user terminal and output on the display of the user terminal.

Additionally, the processor may recommend or suggest actions associated with background music in the user-customized content. For example, if the background music in the user-customized content is changed from the first music to the second music, a message that suggests to change the first action included in the time-series actions to the second action associated with the second music may be transmitted to the user terminal. The user terminal may display the fifth user interface that suggests to change the first action to the second action based on the received message, through which the user may change (or request to change) the first action in the user-customized content to the second action.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), PLDs, FPGAs, processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as RAM, ROM, NVRAM, PROM, EPROM, EEPROM, flash memory, CD, magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include portable computers (PCs), network servers, and portable devices.

Although the present disclosure has been described in connection with some examples herein, various modifications and changes may be made without departing from the scope of the present disclosure, which may be understood by those skilled in the art to which the present disclosure pertains. In addition, such modifications and changes should be considered within the scope of the claims appended herein.

What is claimed is:

1. A method for creating avatar content, comprising:
receiving, from a user, a first user input selecting a first content comprising time-series actions of a first avatar and a second avatar;

displaying a first user interface for selecting one of the first avatar and the second avatar in the first content;

receiving, from the user through the first user interface, a second user input selecting the first avatar;

in response to the receiving the second user input, generating a user-customized content by adding, to the first content, a third avatar associated with the user that performs a same action as the selected first avatar;

displaying a second user interface for editing time-series actions included in the user-customized content;

receiving, from the user through the second user interface, a third user input to change a first action included in the time-series actions to a second action; and in response to receiving the third user input, changing the second avatar and the third avatar from performing the first action to performing the second action in the user-customized content, wherein the second user interface comprises slots corresponding to each of the time-series actions, and wherein each slot represents a preview of each action.

2. The method of claim 1, wherein a set of items applied to the selected first avatar in the user-customized content is applied to the third avatar.

3. The method of claim 1, wherein the first avatar is removed from the user-customized content, and wherein the third avatar is displayed instead of the first avatar.

4. The method of claim 1, wherein the user-customized content comprises a set of time-series actions, the set of time-series actions comprising time-series actions of the first avatar, the second avatar, and the third avatar, wherein the third avatar performs the same action as the first avatar in the user-customized content, and wherein a set of items applied to the first avatar is applied to the third avatar.

5. The method of claim 4, wherein the second avatar performs a different action from the first avatar and the third avatar in the user-customized content.

6. The method of claim 1, further comprising:

receiving, from the user through the second user interface, a fourth user input to add a third action to the time-series actions; and in response to receiving the fourth user input, adding a scene in which the second avatar and the third avatar perform the third action to the user-customized content.

7. The method of claim 1, further comprising:

displaying a third user interface for editing a background image in the user-customized content;

receiving, from the user through the third user interface, a fifth user input to change the background image from a first image to a second image; and in response to receiving the fifth user input, changing the background image in the user-customized content from the first image to the second image.

8. The method of claim 1, further comprising:

displaying a fourth user interface for editing a background music in the user-customized content;

receiving, from the user through the fourth user interface, a sixth user input to change the background music from a first music to a second music; and based on receiving the sixth user input, changing the background music in the user-customized content from the first music to the second music.

9. The method of claim 8, further comprising, in response to the background music in the user-customized content being changed from the first music to the second music, displaying a fifth user interface that suggests to change the first action to a third action associated with the second music.

10. A non-transitory computer-readable recording medium storing instructions that, when executed by one or more processors, cause the one or more processors to:

receive, from a user, a first user input selecting a first content comprising time-series actions of a first avatar and a second avatar;

display a first user interface for selecting one of the first avatar and the second avatar in the first content;

receive, from the user through the first user interface, a second user input selecting the first avatar;

in response to the receiving the second user input, generate a user-customized content by adding, to the first content, a third avatar associated with the user that performs a same action as the selected first avatar;

display a second user interface for editing time-series actions included in the user-customized content;

receive, from the user through the second user interface, a third user input to change a first action included in the time-series actions to a second action; and in response to receiving the third user input, change the second avatar and the third avatar from performing the first action to performing the second action in the user-customized content, wherein the second user interface comprises slots corresponding to each of the time-series actions, and wherein each slot represents a preview of each action.

11. An information processing system, comprising:

at least one memory storing instructions; and at least one processor configured to execute for the instructions to:

receive, from a user terminal, information on a first content comprising time-series actions of a first avatar and a second avatar;

receive, from the user terminal, information on the first avatar, among the first avatar and the second avatar in the first content;

receive, from the user terminal, information on a third avatar associated with a user;

generate a user-customized content by adding the third avatar performing a same action as the first avatar to the first content;

receive, from the user terminal, a request to change a first action included in the time-series actions to a second action; and change the second avatar and the third avatar from performing the first action to performing the second action in the user-customized content.

12. The information processing system of claim 11, wherein a set of items applied to the first avatar in the user-customized content is applied to the third avatar.

13. The information processing system of claim 11, wherein the first avatar is removed from the user-customized content, and wherein the third avatar is displayed instead of the first avatar.

14. The information processing system of claim 11, wherein the user-customized content comprises a set of time-series actions, the set of time-series actions comprising time-series actions of the first avatar, the second avatar, and the third avatar, wherein the third avatar performs the same action as the first avatar in the user-customized content, and wherein a set of items applied to the first avatar is applied to the third avatar.

15. The information processing system of claim 11, wherein the at least one processor is further configured to execute the instructions to:
- receive, from the user terminal, a request to add a third action to the time-series actions; and
- add a scene in which the second avatar and the third avatar perform the third action to the user-customized content.

16. The information processing system of claim 11, wherein the at least one processor is further configured to execute the instructions to:
- receive, from the user terminal, a request to change a background image in the user-customized content from a first image to a second image; and
- change the background image in the user-customized content from the first image to the second image.

17. The information processing system of claim 11, wherein the at least one processor is further configured to execute the instructions to:
- receive, from the user terminal, a request to change a background music from a first music to a second music;
- change the background music in the user-customized content from the first music to the second music; and
- transmit, to the user terminal, a message suggesting to change the first action included in the time-series actions to a third action associated with the second music.

* * * * *